United States Patent Office 2,871,800
Patented Feb. 3, 1959

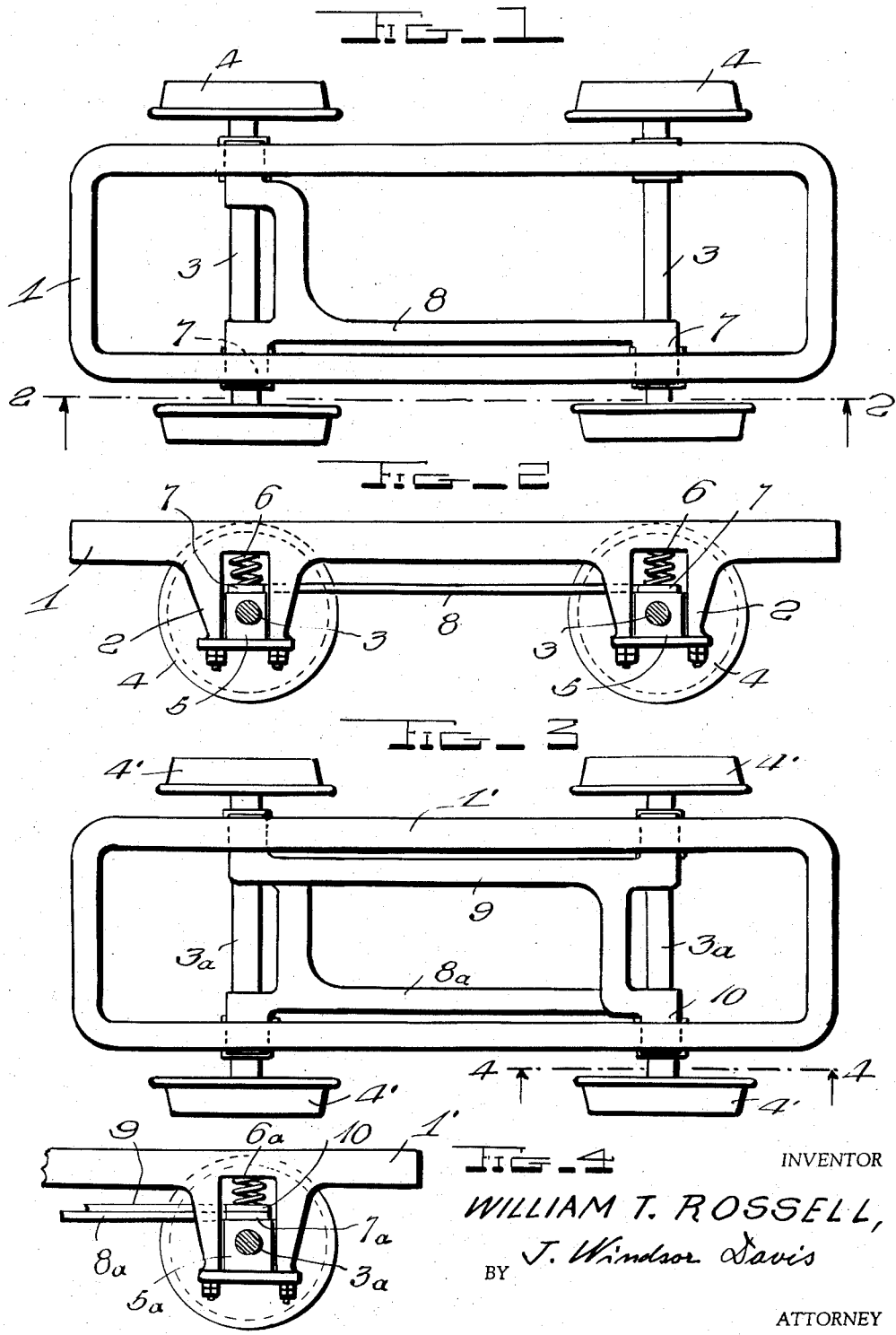

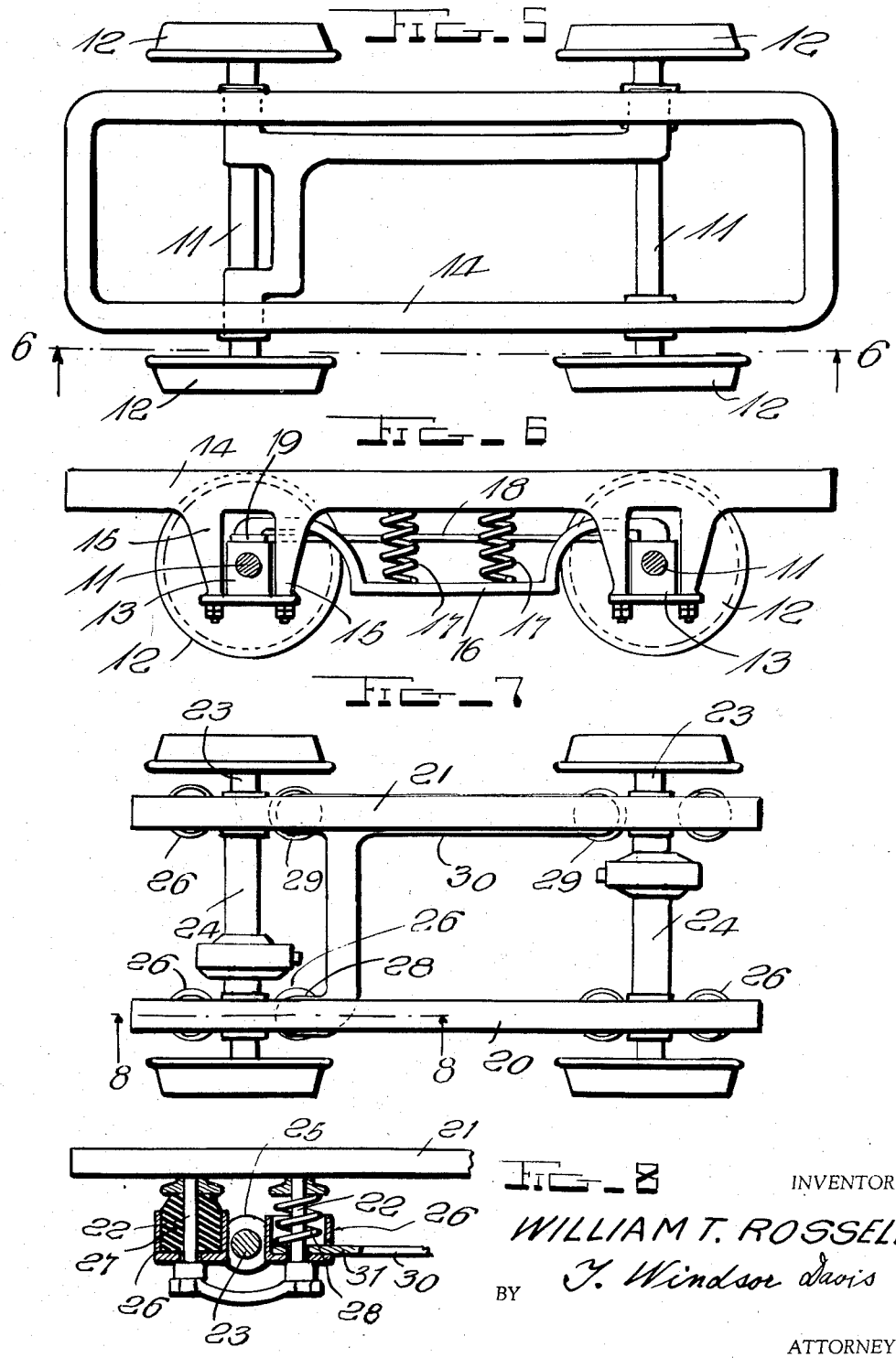

2,871,800

AXLE CONTROL MEANS

William T. Rossell, New York, N. Y., assignor to Transit Research Corporation, New York, N. Y., a corporation of New York Application January 8, 1954, Serial No. 402,885

3 Claims. (Cl. 105—157)

This invention relates to rail trucks and has for its principal object to provide means for damping and substantially eliminating the hunting motions thereof.

When a rail truck is running its axles often assume a position out of normal with respect to the rails. As the flange of at least one of its wheels approaches its rail the axle is given a new direction whereupon the wheel flanges of other wheels will approach the other rail, and so on. A harmonic motion results which is known as hunting. Hunting may be eliminated by rigidifying the axles in parallel with each other but the wheels would jump the rails. It is the main object of this invention to provide a truck having axles which may assume positions out of normal with respect to the side rails of the truck and out of parallel with respect to each other but which can assume these positions only against a substantial frictional resistance.

Another object of the invention is to provide a truck frame and axles supporting the frame, the axles being capable of the usual amount of freedom in a direction fore and aft of the frame without the response of friction as above mentioned but which will be opposed by friction in all movements affecting parallelism of the axles with respect to each other.

Another object of the invention is to provide frictional means opposing tendency of the axles to assume a position out of parallel with each other, the means likewise opposing all tendency of the axles to reassume parallelism once they have become out of parallel.

Another object is to break up the harmonic of hunting, as above described, with a means of simple construction and light weight which can be incorporated in new trucks but which can also be added to existing trucks with little or no change in many well known designs.

Other objects and advantages will become hereinafter more fully apparent as reference is had to the accompanying drawings in which my invention is illustrated as being applied to three well known types of trucks and in which Figure 1 is a plan view of a rail truck equipped with my invention, Figure 2 is a side elevation of one pedestal assembly of the truck of Figure 2, with the wheels removed, taken along the line 2—2 of Figure 1, Figure 3 is a plan view of the truck of Figure 1 with my invention shown applied thereto in duplicate, Figure 4 is a side elevation of one pedestal assembly showing the overlapping of the duplicate parts of Figure 3, taken along the line 4—4 of Figure 3, Figure 5 is a plan view of an equalized truck equipped with my invention, Figure 6 is a side elevation of the truck of Figure 5, Figure 7 shows a plan view of another type of truck equipped with my invention, and Figure 8 is a side elevation of one journal bearing and pedestal assembly thereof, with the spring supports shown in section.

More particularly, 1 indicates a truck frame having a pair of integral pedestals 2 depending from each corner thereof. Two axles 3 extend beyond opposite side rails of the frame 1 and are fixedly mounted in wheels 4. The axles 3 are journalled in journal bearings 5 and the journal bearings 5 support the frame 1. One journal bearing 5 resides between the members of each pair of pedestals 2 and is capable of substantial vertical movements with respect to the frame and limited horizontal movements with respect to its pedestals.

Between each journal bearing and the frame, one or more springs 6 acts to support the frame 1 from the journals. According to my invention the top of the journal bearing is made flat and between three of the four journal bearings and its spring, in each case, I insert a friction plate 7. The three friction plates constitute the integral corners of a three cornered member 8.

This member 8 may be installed on conventional trucks of this type provided the tops of the journal bearings 5 are flattened or equipped with a flat upper plate to serve as a friction element for contact by a corner plate 7.

The operation is as follows: Each journal bearing 5 has some fore and aft and lateral movement with respect to its pedestals 2. As a result, the axles 3 may assume out-of-parallel relations. With the member 8 in place it will be seen that the axles are not free to assume out-of-parallel positions but are still free to assume such positions against the frictional resistance of the plates 7 and the journal bearings. If they find an out-of-parallel relation they can return to parallelism only against the same kind of frictional resistance. There is thus no actual confinement of the axles and journal bearings over and above that conventionally provided so that there will be no added danger of de-railing, however the resistance to such relative movements is sufficient to break up the free movements which lead to harmonic motions. The result is that hunting is substantially eliminated.

The member 8 is a three cornered member for the reason that if it were four cornered it would be called upon for almost constant flexing by reason of the vertical movements of the journal bearings with respect to each other. Such twisting or torsional movements would shorten the life of the member 8. These effects are very considerably reduced by limiting its application to three of the four journal bearings.

If it is desired to apply the invention to all four journal bearings I recommend that this be accomplished as shown in Figures 3 and 4 in which the truck of Figures 1 and 2 is illustrated and in which corresponding parts bear the same numerals primed by the small letter "a." In this modification the member 8a is duplicated by the additional similar member 9. The member 9 has two of its friction plate corners 10 resting on the journals 5a of the axle which previously had but one journal bearing 5a in contact with a friction plate 7a. According to this arrangement two diagonally opposite journal bearings will be contacted by single friction plates 7a and 10, respectively, while the other two journal bearings will be contacted by the friction plates of both members 8a and 9.

The invention is shown as being applied to an equalized truck in Figures 5 and 6. In this case the axles 11 are fixedly mounted in wheels 12 and are equipped with journal bearings 13. The frame 14 has pedestals 15 depending from the corners thereof. Equalizer bars 16 connect the tops of the journal boxes on the same side of the truck and springs 17 support the frame 14 from the equalizer bars. To this point the truck is conventional. Now if the tops of three of the four journal boxes are made flat or equipped with a flat plate it may then present a friction surface. A three cornered plate 18 terminating in a friction plate 19 at each corner is then installed with one friction plate 19 resting between each of the two ends of one equalizer bar 16 and the flat top surface of the adjacent journal bearing 13. The third friction plate 19 rests between either of the remaining two journal bearings and the adjacent end of its equalizer bar.

The operation is the same as has been previously described in connection with Figures 1 and 2.

Figures 7 and 8 illustrate the application of my invention to a modern street car truck. This truck frame 20 is composed of tubular side frames 21 having pedestals 22 depending from the corners thereof. Axles 23 extend through axle housings 24 which connect the side frames 21 and are equipped with journal bearing housings 25.

The housings 25 have spring saddles 26 integral therewith which receive two springs 27 and 28, one fore and the other aft of its axle 23. Each of the springs 27 and 28 encircles a pedestal 22 which extends freely and with clearance through the saddle 26. The axles 23 and housings 25 thus can move horizontally with respect to the pedestals 22 as permitted by the springs 27 and 28.

In order to damp the relative movement of the axles with respect to the pedestals 22 I provide a three cornered friction member 30. This member has one end extending beneath two inside springs 28 and its other end extending beneath an inside spring 29 on the other side of the truck. The ends of the member 30 are each in the form of a flat perforated plate indicated at 31. Each plate 31 is positioned between its spring and the bottom of its spring saddle 26, the saddles each being pierced to permit passage of the plates thereinto. Each plate is of such size that it can move relative to its saddle and the perforation through each plate is of such size that each plate can move horizontally with respect to its pedestal guide 22. The ends of the member 30 thus rest beneath three out of four inside journal springs and each end can move frictionally with respect to the spring saddle upon which it rests.

Thus, relative horizontal movements of the axles 23 and journal bearing housings 25 will be opposed by the frictional resistance of the friction plates 29 and the spring seats of the saddles 26.

The invention lends itself to incorporation in other types of trucks, the members 8, 8a, 18 and 30 being shaped to accommodate themselves to the other truck parts such as bolster, brake rigging, propeller shafts, etc. as will be understood by truck designers.

I therefore desire to be extended protection as defined by the appended claims.

What I claim is:

1. In a rail truck, a truck frame having a pair of pedestals near each corner thereof, axles having journal bearings residing between the members of each of said pairs of pedestals, said axles with their journal bearings having limited relative horizontal movement with respect to each other and with respect to said pedestals, means supporting said frame from each of said bearings, a friction plate interposed between three of said journal bearings and its frame supporting means capable of relative sliding movement with respect thereto and stiff means connecting said friction plates together.

2. In a rail truck, a truck frame having a pair of pedestals near each corner thereof, axles having journal bearings residing between each of said pairs of pedestals and capable of limited horizontal movements with respect thereto and with respect to each other, springs supporting said frame from said journal bearings, a friction plate interposed between some but not all of said journal bearings and their respective springs, said friction plates being movable with respect to their journal bearings, and a rigid member integrally connecting said plates.

3. In a rail truck, a truck frame having a pair of pedestals near each corner thereof, axles having journal bearings residing between each of said pairs of pedestals and capable of limited horizontal movements with respect thereto and with respect to each other, springs supporting said frame from said journal bearings, a friction plate interposed between three of said journal bearings and their respective springs, said friction plates being movable with respect to their journal bearings, and a rigid member generally of L-shape intergrally connected to each of said plates.

References Cited in the file of this patent

UNITED STATES PATENTS 2,774,312    Rossell _____ Dec. 18, 1956